United States Patent [19]

Nakajima et al.

[11] Patent Number: 5,291,067
[45] Date of Patent: Mar. 1, 1994

[54] ELECTRIC CIRCUIT SYSTEM FOR MOTORCYCLE

[75] Inventors: Shinji Nakajima; Masao Takasaka; Tetsuo Yamashita, all of Shizuoka, Japan

[73] Assignee: Suzuki Kabushiki Kaisha, Shizuoka, Japan

[21] Appl. No.: 648,760

[22] Filed: Jan. 31, 1991

[30] Foreign Application Priority Data

Jan. 31, 1990 [JP] Japan .................. 2-18953
Mar. 30, 1990 [JP] Japan .................. 2-87033
May 18, 1990 [JP] Japan .................. 2-128643

[51] Int. Cl.$^5$ .................. B62H 5/00; E05B 65/12
[52] U.S. Cl. .................. 307/9.1; 70/252; 70/257; 70/233; 70/264; 180/289; 361/192
[58] Field of Search .................. 280/835, 202; 307/10.8, 307/9.1, 10.1, 10.3, 10.6; 361/191–193; 70/252, 257, 264, 239, 233; 180/219, 271, 272, 289; 224/32 R

[56] References Cited

U.S. PATENT DOCUMENTS

| | | | |
|---|---|---|---|
| 4,030,322 | 6/1977 | Pettit | 70/159 |
| 4,249,751 | 2/1981 | Lacroix | 70/233 |
| 4,805,427 | 2/1989 | Bates et al. | 70/264 |
| 4,907,428 | 3/1990 | Nakashima et al. | 70/264 |
| 4,940,111 | 7/1990 | Nogami et al. | 180/219 |
| 4,983,883 | 1/1991 | Roland | 307/10.8 |
| 5,020,625 | 6/1991 | Yamauchi et al. | 180/219 |
| 5,094,315 | 3/1992 | Taki et al. | 180/219 |
| 5,127,560 | 7/1992 | Miyamoto et al. | 224/32 R |
| 5,127,561 | 7/1992 | Miyamoto | 224/32 R |

FOREIGN PATENT DOCUMENTS

| | | |
|---|---|---|
| 0008974 | 3/1980 | European Pat. Off. . |
| 0245001 | 11/1987 | European Pat. Off. . |
| 0299524 | 1/1989 | European Pat. Off. . |
| 0193786 | 7/1990 | Japan .................. 280/835 |
| 2058200A | 4/1981 | United Kingdom . |

OTHER PUBLICATIONS

French Search Report No. FR 9101119 completed Feb. 3, 1992 by Examiner G. Denicolai.
English translation of French Search Report No. FR 9101119 completed Feb. 3, 1992 by Examiner G. Denicolai.

*Primary Examiner*—A. D. Pellinen
*Assistant Examiner*—Richard Elms
*Attorney, Agent, or Firm*—Finnegan, Henderson, Farabow, Garrett & Dunner

[57] ABSTRACT

A motorcycle has an article storage box equipped with a lid member which is locked and unlocked and with a fuel tank having a gasoline injection port which is closed or opened by a lid member. The locking and unlocking of the lid members of the storage box and the fuel tank injection port are controlled by an electric circuit system. The electric circuit system includes a battery, a main switch unit operatively connected to the battery, a solenoid switch connected to the main switch unit for carrying out an on-off operation to the lid locking and unlocking mechanism for the fuel tank injection port lid, and a solenoid switch connected to the main switch unit for carrying out an on-off operation to the lid locking and unlocking mechanism for the storage box. The main switch unit includes a plurality of contact points corresponding to a first point of action at which the battery is switched off, a second point of action at which the battery is switched on and at which the lid of the fuel injection port of the fuel tank is unlocked, a third point of action at which the battery is switched on and a current passes to an ignitor and to a lighting unit, and a fourth point of action at which the battery is switched on and the lid of the storage box is unlocked.

6 Claims, 8 Drawing Sheets

ELECTRIC CIRCUIT SYSTEM FOR MOTORCYCLE

BACKGROUND OF THE INVENTION

The present invention relates to an electric circuit system for a two-wheeler and, more particularly, to an electric circuit system for a motorcycle provided with a storage box for accommodating an article such as a helmet, the electric circuit system including a switch means operatively connected to electromagnetic key mechanisms for electromagnetically opening keys provided for a lid of the storage box and a lid of a fuel tank injection port of the motorcycle.

Recent motorcycle are provided with an article storage box for accommodating an article such as a helmet and the storage box is disposed on a central upper portion of the motorcycle body. The opening of the storage box is covered by a lid member which is equipped with a locking and unlocking mechanism.

The locking and unlocking mechanism comprises an electromagnetic means for providing remote control of switches and ensuring a quick and accurate operation.

In this case, however, a theft switch cannot be provided and a special consideration will be thus required such that it is provided at a spot protected by another locking means, or a key switch is used therefor.

The motorcycle is also provided with a fuel tank having a lid on a fuel cap external to the motorcycle body. The fuel tank lid is provided closably on a cover for covering an outer surface of the motorcycle body by means of a hinge mechanism, for example. When the fuel tank lid is opened, a base portion of the lid and an end portion of a cover come into contact with each other and, therefore, an opening angle of the lid is 60 to 90 degrees. Thus, the lid cannot be opened satisfactorily wide. Consequently, an inconvenience is quite unavoidable for the operation of a tank cap and the injection of gasoline. Furthermore, since the tank cap cannot be put on the lid while the gasoline is injected, the tank cap is capable of being left unfastened or lost.

Furthermore, the motorcycle is provided with electromagnetic unlocking devices including unlocking switches separate from a main switch. After the main switch is turned on, the unlocking switches are turned on to carry out the unlocking operation. In the conventional electric circuit system for a motorcycle, for example, an unlocking switch for the storage box and an unlocking switch of a cover of a fuel injection port part are provided behind the main switch as separate switches from the main switch for the electric circuit arrangement. To unlock the storage box, the unlocking switch must be turned on after the main switch is turned on in the past.

When the cover of the fuel injection port part is unlocked, a troublesome procedure is such that the main switch is turned off once to stop the engine, the main switch is then operated again to an on state and the unlocking switch for the cover of the fuel injection port part is operated to an on state to carry out the unlocking.

On the other hand, since the circuit arrangement is such that the unlocking switch for the cover of the fuel injection port part can be operated without stopping the engine, it is unavoidable to work in a dangerous situation such as fueling with the engine being operated.

SUMMARY OF THE INVENTION

An object of the present invention is to substantially eliminate defects and drawbacks encountered in the prior art and to provide an electric circuit system for a lid closing mechanism of a storage box for a two-wheeler such as motorcycle by utilizing a key switch for controlling an ignition power circuit of an engine regardless of whether the engine is in operation or shutdown.

Another object of the present invention is to provide an electric circuit system for a motorcycle including an improved main switch means for a motorcycle including one switch capable of unlocking a storage box thereof without stopping the operation of the engine and another switch capable of unlocking a cover of a fuel tank port in which the engine comes to stop after the main switch is operated.

These and other objects can be achieved according to the present invention, in one aspect, by providing an electric circuit system for a motorcycle provided with a body frame and an article storage box equipment disposed at substantially a central upper portion of the body frame, the storage box equipment including a lid member for opening and closing an opening of the storage box equipment and a lock mechanism for locking and unlocking the lid member including a solenoid means and an electromagnetic unlocking means, the electromagnetic unlocking means comprising a key switch means which includes a cylinder lock unit including a rotor and a switch unit operable to be opened and closed in association with a rotation of the rotor, the switch unit being equipped with a first switch for carrying out an open-close control of an ignition power circuit and a second switch for carrying out an open-close control of a solenoid power circuit, the first switch being closed at a first point of action taken by the rotation of the rotor from a locking position by a predetermined rotating angle, the second switch being closed at a second point of action taken by further advancing rotation of the rotor from the first point of action, the first switch maintaining a closed position during the rotation of the rotor between the first and second points of action, the rotor including a retention mechanism for retaining the rotor at the first point of action and a spring for restoring to the first point of action against a further advancing rotation of the rotor.

In another aspect of the present invention, an electric circuit system is provided for a motorcycle comprising a body frame, an engine unit disposed at substantially a central portion of the body frame, a storage box equipment disposed at a central upper portion of the body frame, a seat and a fuel tank, the storage box equipment including a lid assembly having a lid locking and unlocking mechanism, the fuel tank being provided with a lid member for opening and closing a fuel injection port by a lid locking and unlocking mechanism, the electric circuit system including a battery, a main switch means operatively connected to the battery, a switch means connected to the main switch means for carrying out an on-off operation to the lid locking and unlocking mechanism for the fuel tank injection port lid, a solenoid means connected to the main switch means for carrying out an on-off operation to the lid locking and unlocking mechanism for the storage box, an ignition unit operatively connected to the main switch and to the engine unit, and a lighting circuit for lighting a head lamp of the motorcycle, the switch means including a plurality of contact points corresponding to a first point of action at which the battery is made off, a second point of action at which the battery is made on and the lid of the fuel injection port of the fuel tank is unlocked, a third point of action at which the battery is made on and a current passes to the ignition unit and the lighting circuit and a fourth point of action at which the battery is made on and the lid of the storage box is unlocked.

In a preferred embodiment, the third and fourth points of action are operatively connected so that the fourth point of action is automatically returned to the third point of action. The main switch means further includes a rotor connected to the battery so as to selectively indicate one of the plurality of contact points.

According to the characteristics of the present invention described above, in one aspect, the rotor of a cylinder lock is turned by operation of a key inserted therefor and when the rotor reaches the second @point of action, a solenoid switch is closed to carry a current to the solenoid, thus unlocking the lid locking mechanism. The operation may only be employed for a very short time as far as the second point of/ action and is returned immediately by the operation of the spring or the key in the reverse direction.

The aforementioned operation is carried out without hindrance on the state regardless of whether the engine is in operation or shutdown. That is, while the engine is shut down, the rotor is kept at a locking position, the cylinder lock is released on insertion of the key and from turning the rotor to the second point of action at a stroke by the key, the lid is opened. In this case, the ignition switch is closed when crossing the first point of action, however, no hindrance may result to the engine in shutdown. When the engine is operating, the rotor is kept at the first point of action, led as it stands and then arrives at the second point of action. The rotor is returned immediately to the first point of action by the spring, however, the ignition switch is still kept closed, and therefore, the engine will never come to stop.

In another aspect, the main switch turns the battery off at the first point of action, turns the battery on at the second point of action for unlocking the cover of the fuel injection port part, turns the battery on at the third point of action for feeding a current to the engine ignition unit and the lighting circuit to an operating state, and at the fourth point of action, keeps the battery on to feed a current to the solenoid, thereby unlocking the storage box. In this case, the fourth point of action can be recovered automatically to the third point of action. The switch is turned on at the second point of action, thereby feeding a current of the battery to the solenoid for unlocking the cover of the fuel injection port part.

BRIEF DESCRIPTION OF THE DRAWINGS

For a better understanding of the present invention and to show how the same is carried out, reference is made to, by way of preferred embodiments, the accompanying drawings, in which.

DESCRIPTION OF THE PREFERRED EMBODIMENTS

Figure 1:
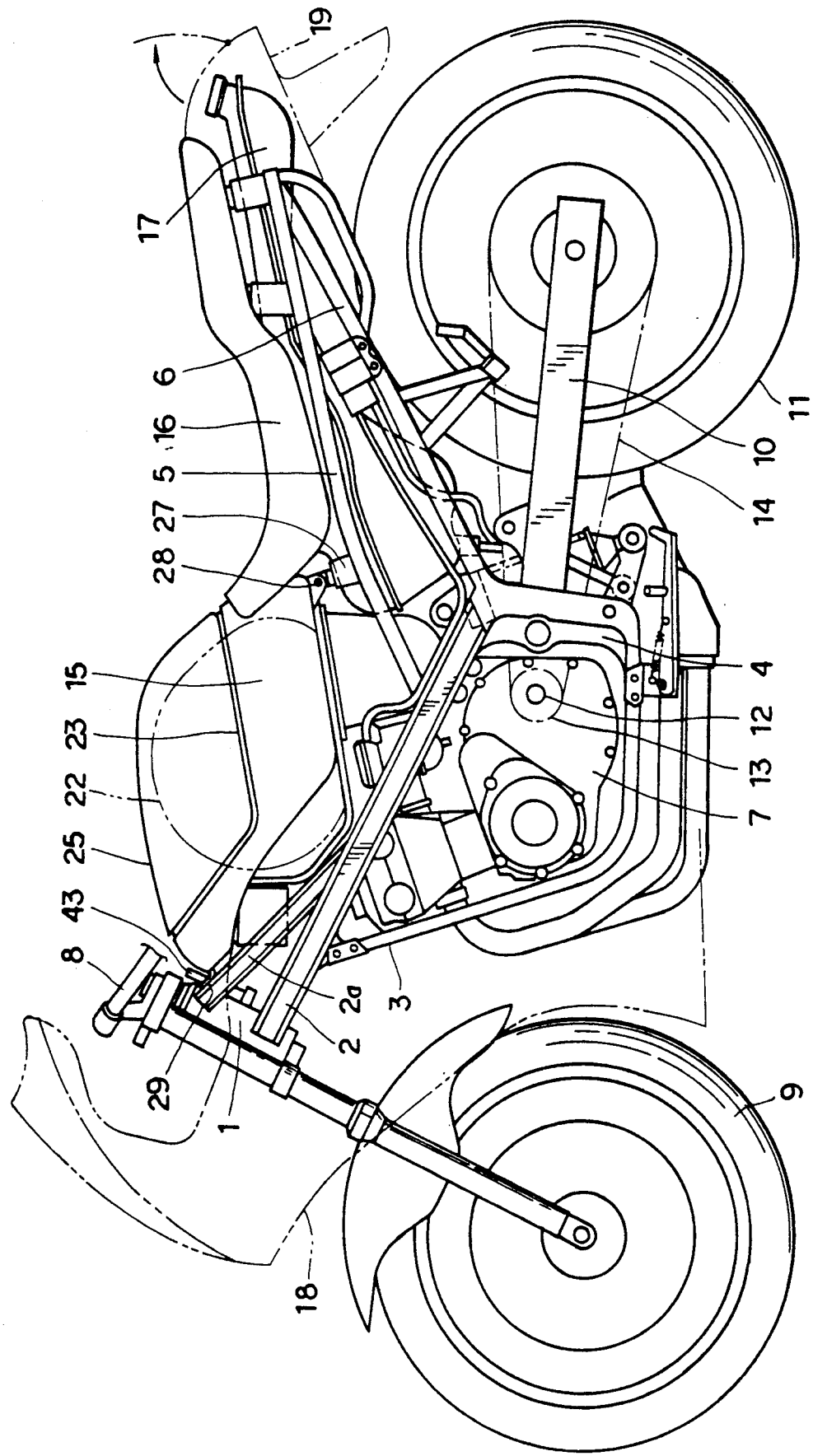
FIG. 1 is a side view of a motorcycle provided with a storage box.
Figure 2:
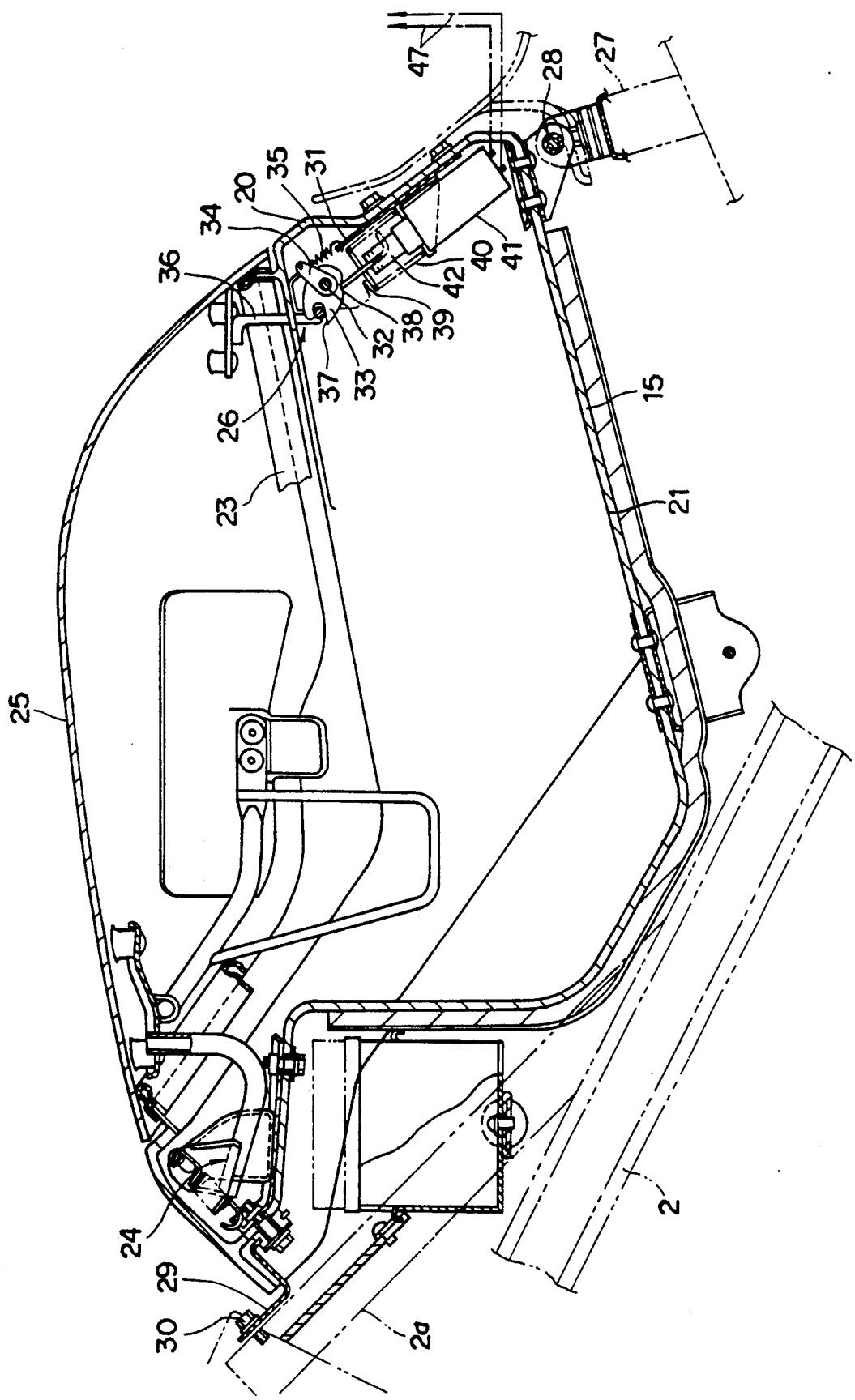
FIG. 2 is a longitudinal sectional view, in an enlarged scale, of the storage box shown in FIG. 1.

First, referring to FIGS. 1 and 2, a frame of the motorcycle is formed almost in inverted trapezoid of a pair of horizontally-opposed main tubes 2 which extends slantingly downwards from a head pipe 1, horizontally-opposed down tubes 3 pendent and extending rearwards, horizontally-opposed central pillars 4 coupling rear ends thereof, and is constructed of horizontally-opposed seat rails 5 connected to rear end portions of the main tubes 2 and extending slantingly upwards, and a body tube 6 connected to rear ends of the main tubes 2 and supporting rear ends of the seat rails 5.

An engine unit 7 is laid within the central inverted-trapezoidal frame. A front wheel 9 steered by a handle bar 8 is journaled in the head pipe I and a rear wheel 11 is supported on rear ends of swing arms 10 journaled in the central pillars 4. The rear wheel 11 is driven from a drive sprocket gear 13 fixed on an output shaft 12 of the engine unit 7.

A storage box 15 is disposed over a space covering from the main tubes 2 to front portions of the seat rails 5, and a tandem seat 16 working as a pillion seat at the same time is placed on the rear seat rails 5. For existence of the storage box 15, a fuel tank 17 is provided within a space surrounded by the seat rails 5 under the seat 16 and the body tube 6.

Both sides of the engine unit 7 under the storage box 15 from the front portion are covered by a cowling 18, and both sides of the fuel tank 17 below a lower edge of the seat 16 are covered by a body cover 19 consecutively therefrom.

A reinforcing upper main tube 2a is laid on the main tubes 2 from the position coming forward to the center to an upper portion of the head pipe 1. The storage box 15 is placed along a configuration of the upper main tube 2a and the seat rail 5.

The storage box 15 is bottomed (base plate 21), having a volume capable of containing a full-face helmet 22 therein, and an opening 23 available therefor is provided on the top. A lid 25 with the front end closable forward by a hinge mechanism 24 is fitted on the opening 23. Further the lid 25 is locked at a close position by a locking mechanism 26.

Then, the storage box 15 has its rear end lower surface journaled shakably upward in the rear onto a bed plate 27 laid between the seat rails 5 through a hinge mechanism 28. A front plate 29 is mounted on the front end lower surface and projecting forward is fastened to a front end of the upper main tube 2a by means of a bolt 30.

The locking mechanism 26 of the lid 25 is set on a base plate 31 mounted along the inside of a rear wall 20 of the storage box 15.

A striker shaft 32 is journaled rotatably on an upper portion of the base plate 31, a striker 33 and a lever 34 are fixed on the striker shaft 32, the striker 33 being energized in the release direction at all times by a spring 35 laid between the lever 34 and the base plate 31.

A hook 36 is provided projectingly on a rear end portion of the lid 25, and when the lid 25 is put on the opening 23 of the storage box 15, its nose engages with a radial groove 37 of the striker 33 to turn the striker 33 in the locking direction.

Further, a cam face provided with a stepped portion 38 on the outer periphery is formed on the striker 33, and a locking lever 39 is connected elastically by a spring 40. As described above, when the striker 33 turns in the locking direction, the locking lever 39 engages with the stepped portion 38 to prevent inversion in the release direction, thus keeping the hook 36 from coming out. That is, the locking mechanism 26 functions.

The locking lever 39 is link-coupled to a moving magnetic core 42 of a solenoid device 41. The moving magnetic core 42 attracts the locking lever 39 against the spring 40 from carrying a current to the solenoid device 41, the striker 33 is released and thus the locking mechanism 26 is released.

Figure 3:
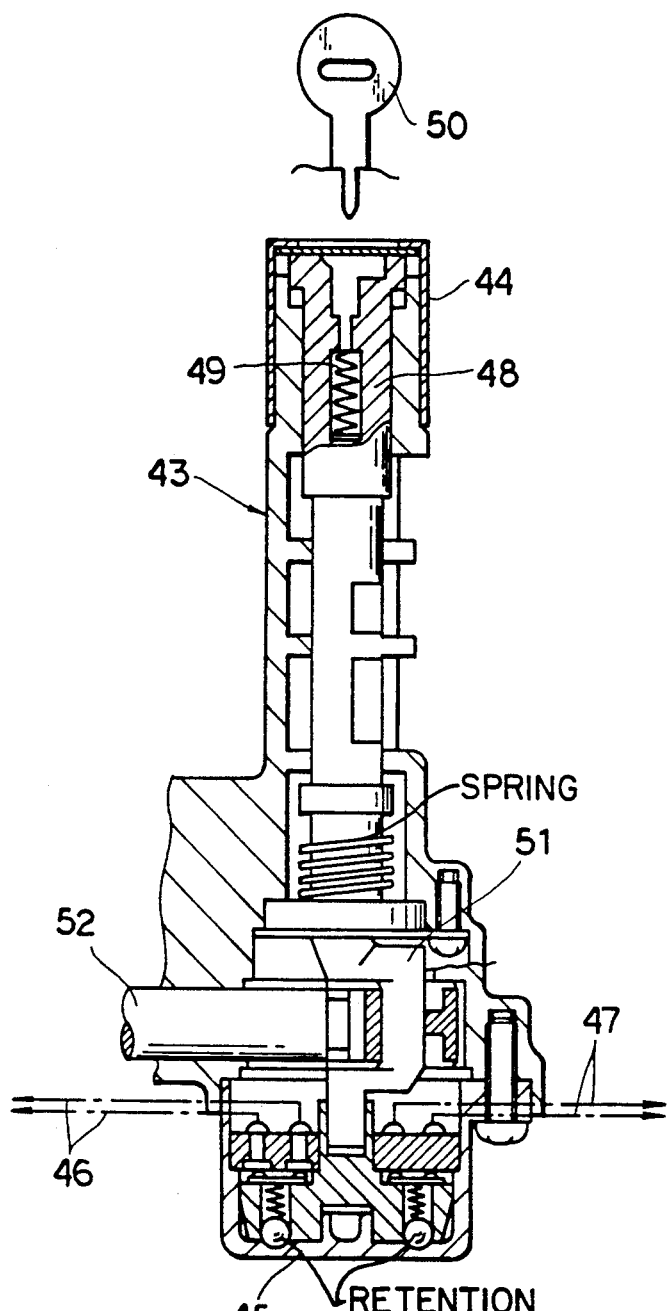
FIG. 3 is an elevated sectional side view of a key switch of a lid closing mechanism of the storage box shown in FIG. 2.
Figure 4:
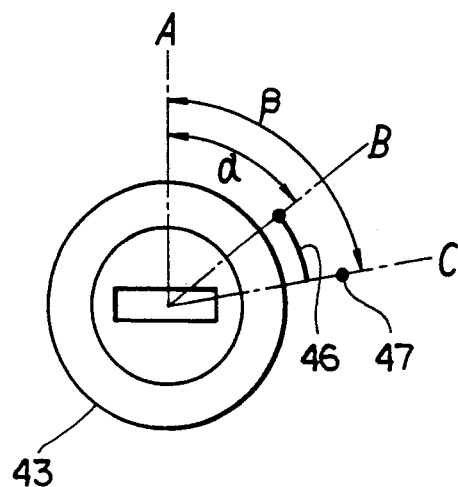
FIG. 4 is an illustration of the operation of the switch means of the key switch of FIG. 3.

Next, FIG. 3 is a longitudinal sectional side view of a key switch used on the lid closing system of the invention, and FIG. 4 is an explanatory drawing of a switching motion thereof.

In FIG. 3, a key switch 43 is that for which a cylinder lock 44 and a switch unit 45 are combined, an ignition switch and a solenoid switch for controlling an ignition power circuit 46 and a solenoid power circuit 47 of the locking mechanism 26 are incorporated in the switch unit 45, thus operating from coming into gear with a turn of a rotor 48 of the cylinder lock 44.

The rotor 48 is mounted unturnably by a tumbler 49, and upon insertion of a key 50, it is disengaged from the tumbler 49 and ready for turning by operation of the key 50.

With a locking position as A, as indicated in FIG. 4, a retention mechanism, whereby it is retained at a first point of action B turned by a predetermined angle a from the position A, is provided on the rotor 48 and a spring whereby it is restored to the first point of action A for further turning therefrom, is installed therein.

An arrangement is made such that the ignition switch closes when the rotor 48 turns to the first point of action B, and the solenoid switch closes when the rotor 48 passes the first point of action B in excess of the predetermined angle or over and turns by an angle β from the locking position. While the rotor 48 turns from the first point of action B to a second point of action C, the ignition switch is kept close.

The key switch is provided additionally with a steering lock function wherein a locking bar 52 retracts through a cam 51 according to a turning motion of the rotor 48, and its nose is disengaged from the steering shaft. It is locked at the aforementioned locking position A of the rotor 48 and unlocked at the first point of action B.

Thus, when the rotor 48 of the cylinder lock 44 is turned to the second point of action C by operation of the key, the solenoid power circuit 47 is closed, and the locking device 26 of the lid 25 is unlocked. The rotor 48 then turns to reach the second point of action C for a very short period of time, the solenoid device 41 functions to unlock, and thus it need not be kept at the position C very long and is returned immediately by the spring.

Further, the lid 25 of the storage box 15 will be opened not only at the time when the engine is shut down but also at the time when the engine is operating.

While the engine is shut down, the rotor 48 is kept at the locking position A, the cylinder lock 44 is released by inserting the key, and the rotor 48 is turned to the second point of action C from the first point of action B by the key. In this case, the ignition switch is closed at the first point of action B, however, the engine will never start up. When a lid lock is released, it is returned immediately to the locking position A.

If the engine is operating, then the rotor 48 is kept at the first point of action B, it may be therefore turned a little to the second point of action C as it stands. The rotor 48 is returned immediately to the first point of action by the spring. However, since the ignition power circuit 47 is still not opened, the engine will never stop.

Thus, the single key switch functions well to control individually the ignition power circuit and the solenoid power circuit for releasing the locking mechanism of the storage box lid without exerting a hindrance on a mutual operation. Accordingly, from the lid closing system in view, a burglar preventing function is ensured naturally by setting an exclusive key for use on the key switch,, Further the key switch can be omitted by one, thus serving for cost reduction.

As described above in a lid closing system for motorcycle storage box disposed on a central upper portion of a motorcycle body and an electromagnetic locking mechanism provided on a closing lid thereof, the present invention comprises a construction in which a cylinder lock and a key switch including of a switchgear operating from coming into gear with its turning rotor are provided, two switches for operating an ignition power circuit and a solenoid power circuit for the locking mechanism are incorporated in the switchgear, the ignition switch closes at a first point of action where the rotor turns at a predetermined angle from a locking position, a solenoid switch closes at a second point of action where the rotor further leads from the first point of action, the ignition switch is set so as to keep a closed state during the period from the first point of action to the second point of action, a retention mechanism retained at the first point of action is provided on the rotor, and a spring for restoring to the first point of action against a further angle of lead is installed therein, An advantage of the present invention is that the lid can be unlocked on a key switch for controlling the engine ignition power circuit, and it is not only operative regardless of the operation and shutdown of the engine but also functions as a powerful burglar preventing apparatus.

Figure 5:
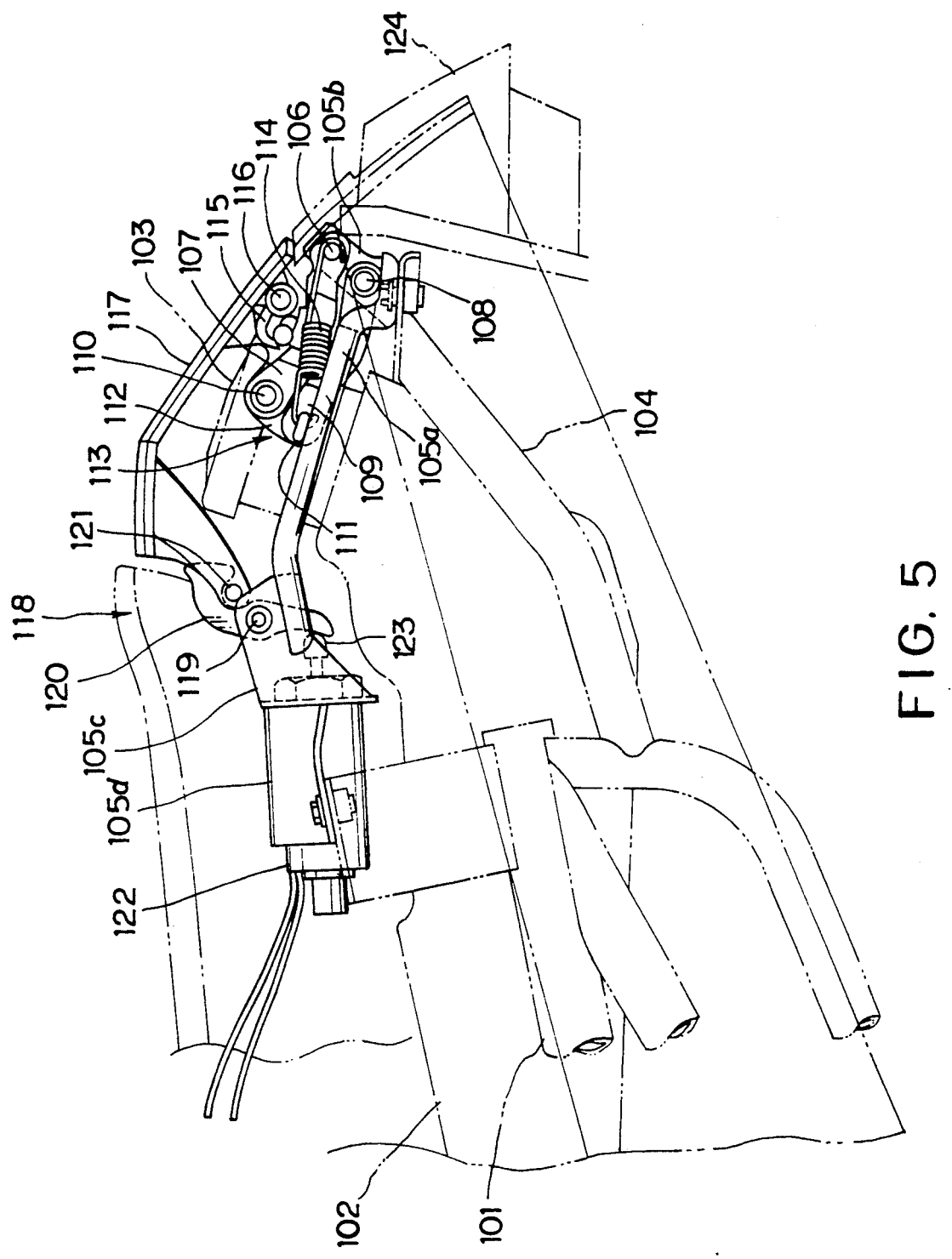
FIG. 5 is a view showing a fuel tank lid mechanism, partially eliminated, of the motorcycle of the type shown in FIG. 1.
Figure 6:
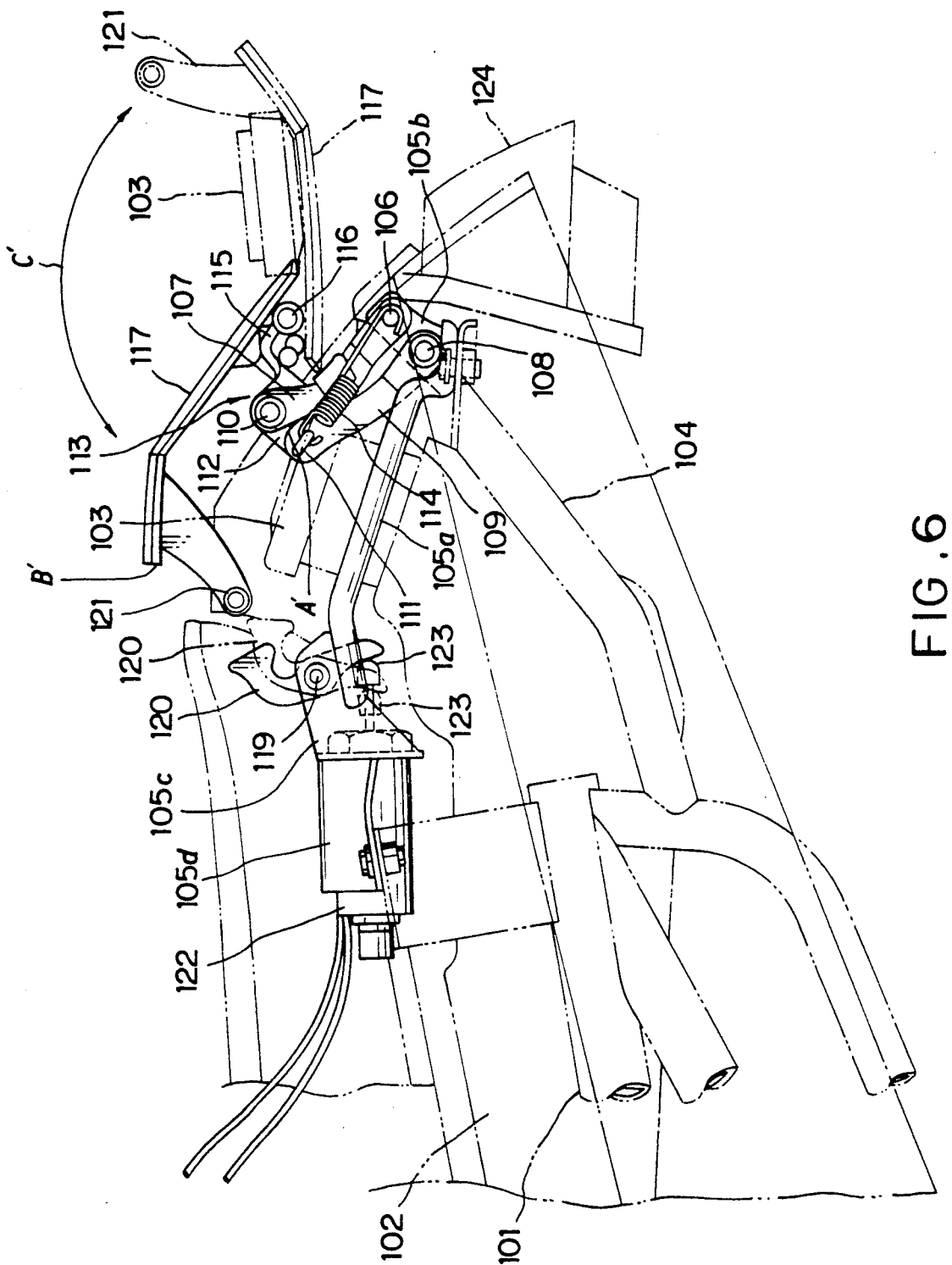
FIG. 6 is a view similar to that of FIG. 5, in which the fuel tank lid is opened.
Figure 7:
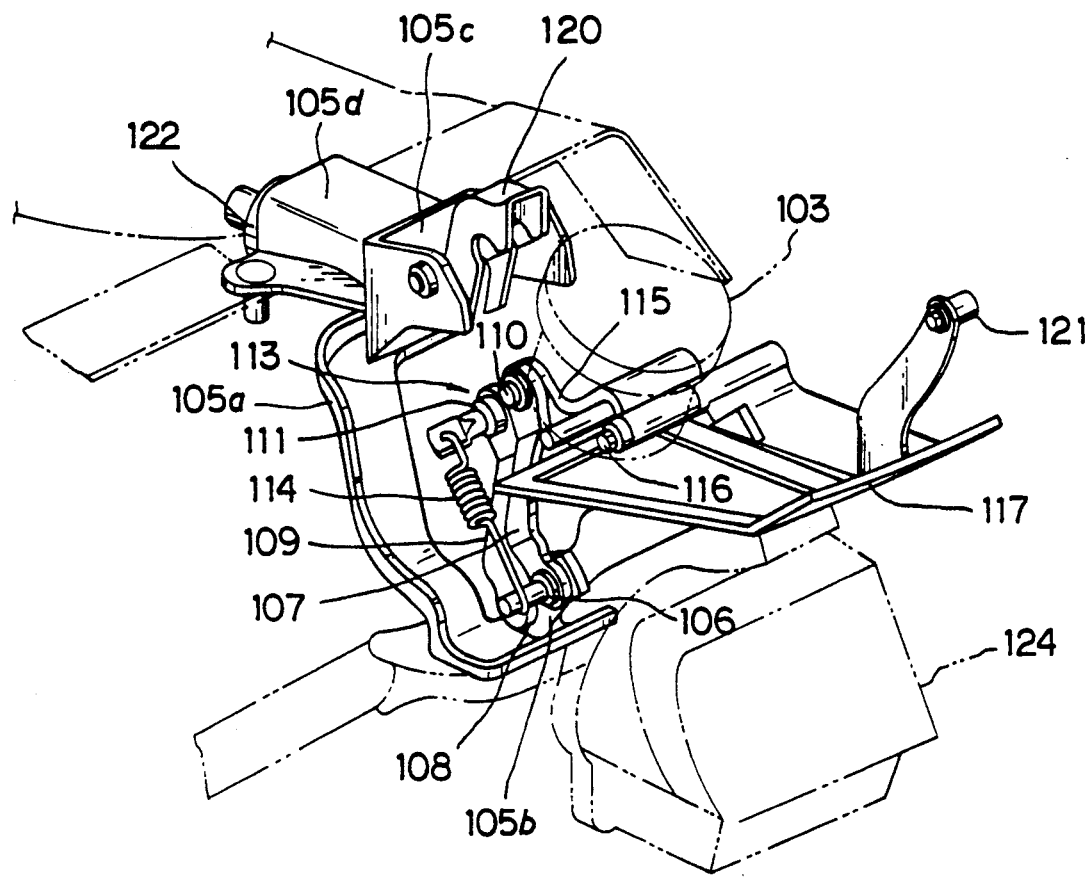
FIG. 7 is a perspective view of the fuel tank lid mechanism of FIG. 5 or 6.

The motorcycle of the type shown in FIG. 1 may be provided with a fuel tank lid mechanism disposed on a rear end portion of a motorcycle as shown in FIGS. 5 to 7, in which a fuel tank 102 is disposed on a rear end portion of a seat rail 101, and a tank cap 103 for covering, an opening portion through which gasoline is injected is provided on a rear end portion of the fuel tank 102. A frame 104 extending rearwards of a motorcycle body is fixed on the seat rail 101, and a supporting member 105a is fixed on a rear end portion of the frame 104. The supporting member 105a extends longitudinally of the body and has a supporting member 105b fixed on the rear end portion. A supporting member 105c is provided integrally on a front end portion of the supporting member 105a and a supporting member 105d is fixed on the supporting member 105c.

An upper hinge 107 is supported swingably on the supporting member 105b around a supporting point 106, and a lower hinge 109 is supported swingably around a supporting point 108. An opposed portion 112 is connected rotatably to nose portions of the upper hinge 107 and the lower hinge 109 around supporting points 110 and 111, respectively. A four-node rotary chain mechanism 113 is constructed of the supporting member 105b, the upper hinge 107, the lower hinge 109 and the opposed portion 112. The supporting member 105b functions as a fixed node fixed on the frame 104, and the opposed portion 112 functions as a node opposite to the supporting member 105b as a fixed node. The supporting points 106, 108, 110 and 111 working as a rotating shaft each for the four-node rotary chain mechanism 113 are disposed so as to be paralleled with an outer surface of the rear end portion of the body (or vertical to a drawing paper surface in FIG. 5).

The four-node rotary chain mechanism 113 has a spring 114 laid between the supporting point 106 and the supporting point 111, and thus the opposed portion 112 is energized by the spring 114 so as to move externally of, the motorcycle body. An extension 115 extending externally of the body is provided integrally on the opposed portion 112, and a lid 117 covering the tank cap 103 outwards is supported rotatably on an outer end portion of the extension 115 by a supporting point 116. A rotating shaft of the supporting point 116 extends vertically to the paper surface of FIG. 5.

On the other hand, a locking mechanism 118 for keeping a closed state of the lid 117 is mounted on the support members 105c and 105d. A hook 120 rotatable around a supporting point 119 is supported on the supporting member 105c, which is engageable with a hook roller 121 provided inside the motorcycle body of a turning nose portion of the lid 117 at the time of locking. A solenoid 122 is mounted on the supporting member 105d, and from a contact portion 123 extending from the solenoid 122 depressing a lower end portion of the hook 120, the hook 120 turns around supporting point 119, thus releasing an engaged state of the hook 120 with the hook roller 121. A reference numeral 124 denotes a tail lamp.

The operation of the fuel tank lid mechanism will be described hereunder.

At the time when the lid 117 is closed, the hook 120 and the hook roller 121 of the lid 117 are engaged with each other as shown in FIG. 5, and the spring 114 is kept energizing the opposed portion 112 externally of the motorcycle body.

When opening the lid 117, the solenoid 122 is actuated and from turning the hook 120 by the contact portion 123 as shown in FIG. 6, the hook 120 is disengaged from the hook roller 1121. When the engaged state is released, since the opposed portion 112 is energized externally of the motorcycle body by the spring 114, the four-node rotary chain mechanism 113 operates to move the opposed portion 112 externally of the body, and the lid 117 supported on the extension 115 of the opposed portion 112 is lifted externally of the motorcycle body. In this case, the upper hinge 107 and the lower hinge 109 come in contact with each other at a portion A', thus functioning as a stopper.

When the lid 117 is lifted, the lid 117 is then turned around the supporting point 116 as indicated by an arrow C' by applying fingers to a portion B' and lifting.

Since the lid 117 is turned around the supporting point 116 being after lifted once, the opening angle will not be limited by a base portion of the lid 117 coming in contact with an outer surface of the motorcycle body as in the case of prior art. The opening angle of the lid 117 can be taken wide (140 to 180 degrees), and thus the lid 117 can be opened until the back of the lid 117 faces upward.

The cap 103 will be opened after once the lid 117 is opened, and gasoline is poured into the fuel tank 102. In this case, the tank cap 103 once demounted can be placed on an upper surface of the lid 117.

After gasoline is injected, the tank cap 103 is mounted, and after the lid 117 is positioned in the original state, the lid 117 is pushed externally against an energizing force of the spring 114. The hook roller 121 and the hook 120 are engaged with each other for locking, thereby keeping a closed state of the lid 117.

Thus, according to the above-described embodiment, an opening angle of the lid 117 can be taken wide, therefore the tank cap 103 can be demounted or remounted with ease and gasoline injection can also be facilitated.

Then, since the demounted tank cap 103 can be placed on an upper surface of the lid 117, the tank cap 103 can be prevented from being left unfastened or lost.

Further, related parts of the fuel tank lid mechanism can be incorporated in the supporting members 105a, 105b, 105c and 105d, and therefore, a closing check can be made on a separate process, thus decreasing a fraction defective sharply.

In the above, the description has referred to the case where the fuel tank lid mechanism is provided on a rear end portion of the motorcycle, however, this embodiment may be applied likewise to the case where it is provided on a side of other vehicles such as three-wheeler, four-wheel car and the like.

According to this embodiment, a four-node rotary chain mechanism is provided having a fixed node secured on a car body, in which a rotating shaft of the four-node rotary chain mechanism is disposed in parallel with an outer surface of the car body. An extension on a node opposite to the fixed node is provided externally of the motorcycle body. A lid is rotatably supported on the extension, a spring for energizing the four-node rotary chain mechanism is provided externally of the motorcycle body, and a locking mechanism for keeping a closed state of the lid an energizing force of the spring is provided. Thus, an opening angle of the lid can be taken wide, injection of gasoline can be facilitated, and since a tank cap can be placed on an upper surface of the lid, the tank cap can be prevented from being left unfastened or lost.

Hereinafter, an electric circuit system for a two-wheeler, preferably a motorcycle, of the type described hereinbefore will be described, but the electric circuit system may be applied to embodiments other than the described type of motorcycle.

For a better understanding of the electric circuit system for electromagnetically unlocking the storage box and the cover of the fuel lid mechanism according to the present invention, a conventional one will be first described with reference to FIG. 8, which, is applicable to a two-wheeler, preferably a motorcycle.

Figure 8:
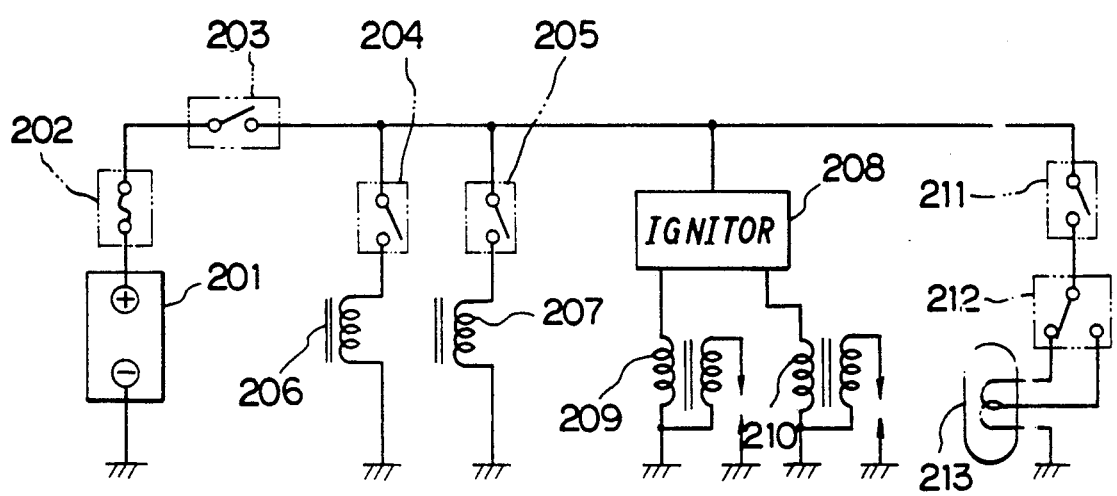
FIG. 8 is an electric circuit arrangement for a motorcycle of prior art.

FIG. 8 shows a circuit arrangement for the motorcycle, in which reference numeral 201 denotes a battery, for the motorcycle, provided with a fuse 202. A main switch 203 is connected to the battery 201 to turn on and off the same. Reference numeral 204 denotes an unlocking switch for the storage box and numeral 205 denotes an unlocking switch for the cover of the fuel injection port part. A solenoid 206 is connected to the unlocking switch 204 for the storage box and a solenoid 207 is connected to the unlocking switch for the fuel port cover. Reference numeral 208 denotes an ignitor for the engine of the motorcycle and engine ignition coils 209 and 210 are connected to the ignitor 208. A lighting operation of a head lamp 213 is managed by a lighting switch 211 and a dimmer switch 212.

Referring to FIG. 8, when the main switch 203 is turned on, the respective parts are ready for operations and the ignitor 208 actuates the ignition coils 209 and 210 for operating the engine of the motorcycle. In such state, the head lamp 213 lights up through the operation of the lighting switch 211, and the dimmer switch 212 is operated as occasion demands, thereby dimming the head lamp 213. Under the condition, when the unlocking switch 204 is operated, the unlocking solenoid 206 is operated and when the unlocking switch 205 is operated, the unlocking solenoid 207 is actuated to unlock the cover of the fuel injection port. As illustrated, the unlocking switches 204 and 205 are provided behind the main switch 203 as separate switches for the electric circuit arrangement, whereby problems described in the background of this specification were caused in the conventional arrangement.

In order to obviate these problems, the electric circuit system for the motorcycle according to the present invention particularly provides a main switch wherein the storage box is unlocked by operating the main switch, and the engine need not be stopped in this case. Releasing the hand after the unlocking operation returns the engine automatically to an ordinary on state. The fuel port cover is also unlocked by another switch after the main switch is operated, and the engine comes to a stop in this case. Also, in this case, the engine key cannot be pulled out.

The electric circuit system according to the present invention will be described hereunder with reference to FIGS. 9 and 10, in which like reference numerals are added to elements or parts corresponding to those shown in FIG. 8.

Figure 9:
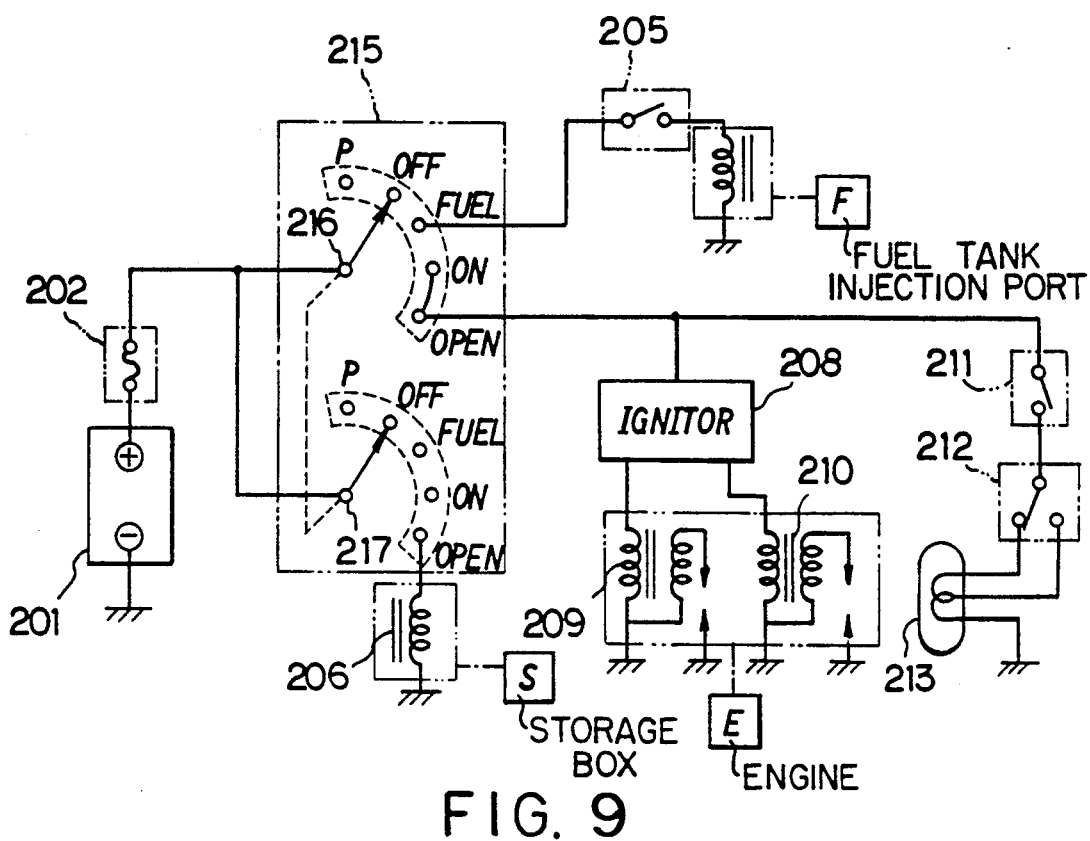
FIG. 9 is an electric circuit arrangement for a motorcycle according to the present invention.

Referring to FIG. 9, a reference numeral 215 denotes a main switch means (ignition switch) of the present invention, which is operated by an engine key. The main switch means 215 includes interlocking rotors 216 and 217. The letters "P", "OFF", "FUEL", "ON", "OPEN" indicate contacts of each operating position of the rotors 216 and 217. The contacts of both operating positions "ON" and "OPEN" corresponding to the rotor 216 are connected electrically.

Figure 10:
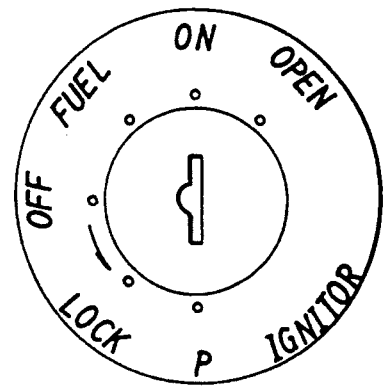
FIG. 10 is an illustration showing an operation panel for a main switch of the circuit arrangement of FIG. 9.

FIG. 10 shows an operating panel of the main switch means 215. The labels "P", "OFF", "FUEL", "ON", "OPEN" disposed around an engine key insertion hole 220 indicated by a longitudinal slot centrally of the operating panel indicate operating positions corresponding to the contacts shown in FIG. 9, and an operating position "LOCK" is indicated additionally between the operating positions "P" and "OFF". In the circuit system of the present invention, the main switch means 215 comprises a contact of a first operating position ("OFF") for turning the battery 201 off, a contact of a second operating position ("FUEL") for turning the battery 201 on to unlock a cover of a fuel injection port part, a contact of a third operating position ("ON") for turning the battery 201 on to feed a current to the engine ignition device including an ignitor 208 and ignition coils 209 and 210, and the lighting circuits 211, 212 and 213, and a contact of a fourth operating position ("OPEN") connected to the contact of the third operating position and turning the battery 201 on to feed a current to the solenoid 206 unlocking the storage box and is ready for operation in that order. In this case, the construction is such that the fourth operating position ("OPEN") is recovered automatically to the third operating position ("ON").

The switch 205 controls a current of the battery 201 from the contact of the second operating position ("FUEL") of the main switch means 215 to the solenoid 207 for unlocking the cover of the fuel injection port part of a fuel tank F.

In FIG. 9, each operating position of the main switch means 215 comes in the order of "P", "LOCK", "OFF", "FUEL", "ON" and "OPEN" from the left, and the main switch means 215 is operated in that order. Here, "P" indicates a parking position, "LOCK" indicates a locking position, "OFF" indicates an engine stop position, "FUEL" indicates a fuel injecting position, "ON" indicates an engine operating position, and "OPEN" indicates a storage box unlocking position.

The engine key is detachable at every operating positions "P", "LOCK" and "OFF" and a current from the battery 201 will not be fed at these operating positions.

When the engine key is inserted to the operating position "ON", a current from the battery 201 is ready for feeding to each part by way of the rotor 216, the ignitor 208 operates for ignition by the ignition coils 209 and 210 which are operatively connected to an engine E, thus activating the engine. In such state, the head lamp 213 is lighted by an operation of the lighting switch 211, and the head lamp 213 can be dimmed as occasion demands by operating the dimmer switch 212.

When unlocking the storage box S, the main switch 215 is further turned to the position "OPEN". The unlocking solenoid 206 then operates on a current fed from the battery 201, and thus the storage box S is unlocked. At the operating position "OPEN", a current is fed to each part likewise as in the case of "ON", and the engine will not stop. When releasing the hand from the position "OPEN", the rotors 216 and 217 are returned automatically to the operating position "ON" by an automatic recovery spring provided on the main switch 215 which is not indicated.

When returning from the operating position "ON" to the position "FUEL", current from the battery 201 is cut and the engine E comes to a top. If the unlocking switch 205 for the cover of the fuel injection port part of the fuel tank F is turned on in this state, then the unlocking solenoid 207 operates to unlock the cover of the fuel injection port part, which is ready for fuel injection. The engine key cannot be pulled out in this state.

When stopping the engine, the main switch means 215 is returned to the position "OFF", thus the current to each part is cut off, and the engine comes to a stop. The engine key can be pulled out at this position.

Further, by keeping it to the lock position, a theft can be prevented by proper means such as, for example, handlebar locking and the like.

Also, by keeping it to the "P" position, a safety can be retained at the time of parking.

The engine key is detachable at any positions "OFF", "LOCK" and "P".

As described above, according to the circuit system relating to the present invention, an operation for unlocking a helmet containing box is realizable other than ordinary operations in a two-wheeler, such as a motorcycle or scooter. The operation is simplified, and when unlocking the storage box, an engine need not be stopped, which is convenient when passing a tollgate for example. Further, a fuel tank injection port cannot be unlocked unless the engine is stopped, therefore a danger such as flammability or the like resulting from oil from the running engine can be prevented.

Furthermore, it is to be understood that the present invention is not limited to the described preferred embodiments and many other changes and modifications may be made without departing from the scopes of the appended claims.

What is claimed is:

1. An electric circuit system for a motorcycle having a body frame and a storage box disposed substantially at a central upper portion of the body frame, the storage box including a lid member for opening and closing the storage box and a lock mechanism including a solenoid means and an electromagnetic unlocking means for locking and unlocking the lid member, said electric circuit system having an ignition power circuit and a solenoid power circuit, said electromagnetic unlocking means having a key switch means comprising:
 a cylinder lock unit including a rotor; and
 a switch unit having a first switch and a second switch, each capable of being opened and closed in association with a rotation of said rotor, said first switch controlling an activation of said ignition power circuit and said second switch controlling an activation of said solenoid power circuit, said first switch being closed at a first point of action taken by the rotation of said rotor from a locked position by a predetermined rotation angle, said second switch being closed at a second point of action taken by further rotation of said rotor from the first point of action, said first switch maintaining a closed position during the rotation of said rotor between the first and second points of action, said rotor including a retention mechanism for retaining the rotor at the first point of action and a spring means for restoring the rotor to the first point of action against a further rotation of the rotor, wherein said lid member can be unlocked while the ignition power circuit is activated.

2. An electric circuit system according to claim 1, comprising a lock lever and a cam member, said lock lever being connected to a steering shaft and operated by the rotation of said rotor through said cam member for providing a steering lock function.

3. An electric circuit system for a motorcycle comprising a body frame, an engine unit disposed substantially at a central portion of the body frame, a storage box disposed at a central upper portion of the body frame, and a fuel tank, said storage box including a lid assembly having a first lid locking and unlocking mechanism, said fuel tank injection port by a second lid locking and unlocking mechanism, said electric circuit system comprising:
 a battery;
 main switch means operatively connected to said battery;
 second switch means connected to said main switch means for carrying out an on-off operation of said second lid locking and unlocking mechanism for the fuel tank injection port lid member;
 solenoid means connected to said main switch means for carrying out an on-off operation of said first lid locking and unlocking mechanism for the storage box;
 an ignition section operatively connected to said main switch and to the engine unit; and
 lighting circuit means for lighting a head lamp of the motorcycle,
 said main switch means including a plurality of contact points corresponding to a first point of action at which the battery is switched off, a second point of action at which the battery is switched on and the lid of the fuel tank injection port is unlocked, a third point of action at which the battery is switched on and a current passes to the ignition section and the lighting circuit means, and a fourth point of action at which the battery is switched on, the current passes to the ignition section and the lid of the storage box is unlocked.

4. An electric circuit system according to claim 3, wherein said third and fourth points of action are operatively connected so that the fourth point of action is automatically returned to the third point of action.

5. An electric circuit system according to claim 3, wherein said second point of action is electrically connected to the second switch means that operates a solenoid means for unlocking the fuel tank lid locking mechanism.

6. An electric circuit system according to claim 3, wherein said main switch means further includes a rotor means connected to said battery for selectively indicating one of said plurality of contact points.

* * * * *

UNITED STATES PATENT AND TRADEMARK OFFICE
CERTIFICATE OF CORRECTION

PATENT NO. : 5,291,067
DATED : March 01, 1994
INVENTOR(S) : Shinji NAKAJIMA et al.

It is certified that error appears in the above-indentified patent and that said Letters Patent is hereby corrected as shown below:

Claim 3, column 12, line 9, before "injection" insert --including a lid member for opening and closing a fuel tank--.

Signed and Sealed this

Twenty-fifth Day of October, 1994

Attest:

BRUCE LEHMAN

*Attesting Officer*    *Commissioner of Patents and Trademarks*